UNITED STATES PATENT OFFICE.

JOSIAH N. BIRD, OF NEW YORK, N. Y.

IMPROVEMENT IN THE MANUFACTURE OF STEEL.

Specification forming part of Letters Patent No. 43,562, dated July 19, 1864.

*To all whom it may concern:*

Be it known that I, JOSIAH N. BIRD, of the city, county, and State of New York, have invented a new and useful Improvement in the Manufacture of Steel; and I do hereby declare that the following is a full, clear, and exact description of the same.

The mode of manufacturing steel commonly practiced in this country is to take iron bars, cut them up into small pieces, which are put into pots with carbonaceous matter and subjected to heat in a suitable furnace till carbonized and melted. The molten metal is then formed into ingots, which are drawn by hammers or between rolls into bars.

This invention consists in the manufacture of steel direct from the blooms without drawing them into bars.

To enable others skilled in the art to make steel by my invention, I will proceed to describe the process.

The blooms received from the bloomary are first allowed to cool, and either cut into scraps by means of shears, or planed into shavings by a planing-machine, or otherwise cut into small or thin pieces, and these scraps, shavings, or pieces are put into the melting-pots with the carbonaceous matter and some suitable flux, and subjected to the heat in the melting-furnace until carbonized and melted, and afterward poured into ingots and drawn into bars, as in manufacturing steel from bar-iron.

The flux which I generally use is lime, and the quantity from half ($\frac{1}{2}$) a pound to five (5) pounds, according to the quantity of slag, which depends on the quality of the blooms.

In this process it will be understood that the cutting or planing up of the blooms into scraps, shavings, or small or thin pieces is substituted for drawing them down into bars and cutting up the bars, and a great saving of time, labor, and fuel is effected, whereby the steel is produced of as good a quality at a considerable reduction of expense.

What I claim as my invention, and desire to secure by Letters Patent, is—

The manufacture of steel from non-carbonized or decarbonized iron by cutting the latter into small pieces or shavings and afterward applying the carbonizing agent, all as herein described.

J. N. BIRD.

Witnesses:
J. W. COOMBS,
GEO. W. REED.